Jan. 28, 1964

N. B. MURPHY 3,119,580

WHEEL FORCE SENSOR FOR CONTROL OF AN AIRCRAFT AND
OPERATIVE TO MODIFY AN AUTOMATIC PILOT CONTROL
SYSTEM FOR THE AIRCRAFT

Filed May 3, 1961

INVENTOR.
NORMAN B. MURPHY
BY
Herbert L. Davis

ATTORNEY

Jan. 28, 1964  N. B. MURPHY  3,119,580
WHEEL FORCE SENSOR FOR CONTROL OF AN AIRCRAFT AND
OPERATIVE TO MODIFY AN AUTOMATIC PILOT CONTROL
SYSTEM FOR THE AIRCRAFT
Filed May 3, 1961  3 Sheets-Sheet 3

INVENTOR.
NORMAN B. MURPHY
BY *Herbert L. Davis*

ATTORNEY

United States Patent Office 3,119,580
Patented Jan. 28, 1964

3,119,580
WHEEL FORCE SENSOR FOR CONTROL OF AN AIRCRAFT AND OPERATIVE TO MODIFY AN AUTOMATIC PILOT CONTROL SYSTEM FOR THE AIRCRAFT
Norman B. Murphy, Tenafly, N.J., assignor to The Bendix Corporation, Teterboro, N.J., a corporation of Delaware
Filed May 3, 1961, Ser. No. 107,383
3 Claims. (Cl. 244—83)

The invention relates to improvements in an aircraft control device for use in a system of a type such as disclosed and claimed in U.S. Reissue Patent No. Re. 25,356, granted March 19, 1963, to Robert E. Feucht, John Jarvis and John C. Ziegler, and assigned to The Bendix Corporation, and to a manual control wheel particularly adapted for use in a system for modifying or overcoming an aircraft automatic pilot control of a type disclosed and claimed in the aforesaid patent application for reissue thereof.

In the control mechanism disclosed in the aforenoted patent, there are provided deflection sensing synchros suspended exteriorly of a control stick and through an interconnecting linkage arrangement effective to sense a deflection of the control stick in a fore and aft or sideward direction so as to provide electrical signals for resetting the automatic pilot in a pitch or roll sense dependent upon the direction and magnitude of the force applied to the control stick.

An object of the present invention is to provide a novel, simplified and improved control wheel and column assembly in which the pitch and roll control elements are mounted about the hub of the wheel and in such a manner as to avoid any interconnecting linkage elements and whereby no discernible cross coupling is effected between the pitch and roll channel control signals effected by fore and aft movement of the control wheel and column assembly or angular movement of the control wheel relative to the control column assembly.

Another object of the invention is to provide an improved control wheel and column assembly in which the force applied purely in a fore and aft direction to the control wheel and column assembly in a pitch sense results only in a signal in a pitch sense while a force applied to the control wheel to effect an angular movement thereto relative to the column assembly in a roll sense causes a similar result by effecting only a signal in a roll sense; and the arrangement is such that forces applied to the control wheel and column assembly in both pitch and roll senses will produce signals that are proportional to the commands in the aforenoted directions.

Another object of the invention is to provide an improved control wheel and column assembly in which the hub of the control wheel is slidably and rotatably supported on a steering shaft of the column assembly by a resilient diaphragm spring so designed and arranged that its deflection under load is known and maintained accurately and there is mounted exteriorly of the column assembly highly sensitive, electrical pickup means mounted adjacent the hub and cooperatively arranged relative to a flange portion affixed to the steering shaft and in which assembly the electrical pickup means is carried along inner surfaces of the spokes of the wheel and are operatively engaged by the flange portion of the steering shaft so that upon deflection of the resilient diaphragm supported control wheel in a fore and aft or angular sense relative to the flange portion of the steering shaft the electrical pickup means effects output signals varying in sense and magnitude with the sense and magnitude of the deflective force applied to the control wheel within the range of deflective movement of the resilient diaphragm relative to the steering shaft.

Another object of the invention is to provide an improved control wheel of the aforenoted type in which the resilient diaphragm spring is suitably slotted in an arcuate plane so that a deflection of the control wheel in a fore or aft sense relative to the steering shaft requires a distinctly different force than the force required to effect a deflection of the control wheel in an angular sense so that the control of the plane in a pitch sense by the fore and aft deflection of the control wheel or in a roll sense by the angular deflection of the control wheel is accompanied by a feel of the control wheel which approximates that sensed by the pilot when flying under manual control. Moreover, in the aforenoted arrangement there is no discernible cross coupling between the roll and pitch channels and a force applied merely in a pitch sense will result only in a pitch signal and a force applied merely in a roll sense will result only in a roll signal while a force commanding both pitch and roll will produce signals that are proportional to the commands in each channel.

These and other objects and features of the invention are pointed out in the following description in terms of the embodiment thereof which is shown in the accompanying drawings. It is to be understood, however, that the drawings are for the purpose of illustration only and are not intended as a definition of the limits of the invention, reference being had to the appended claims for this purpose.

In the drawings wherein like parts are marked alike:

Figure 1:
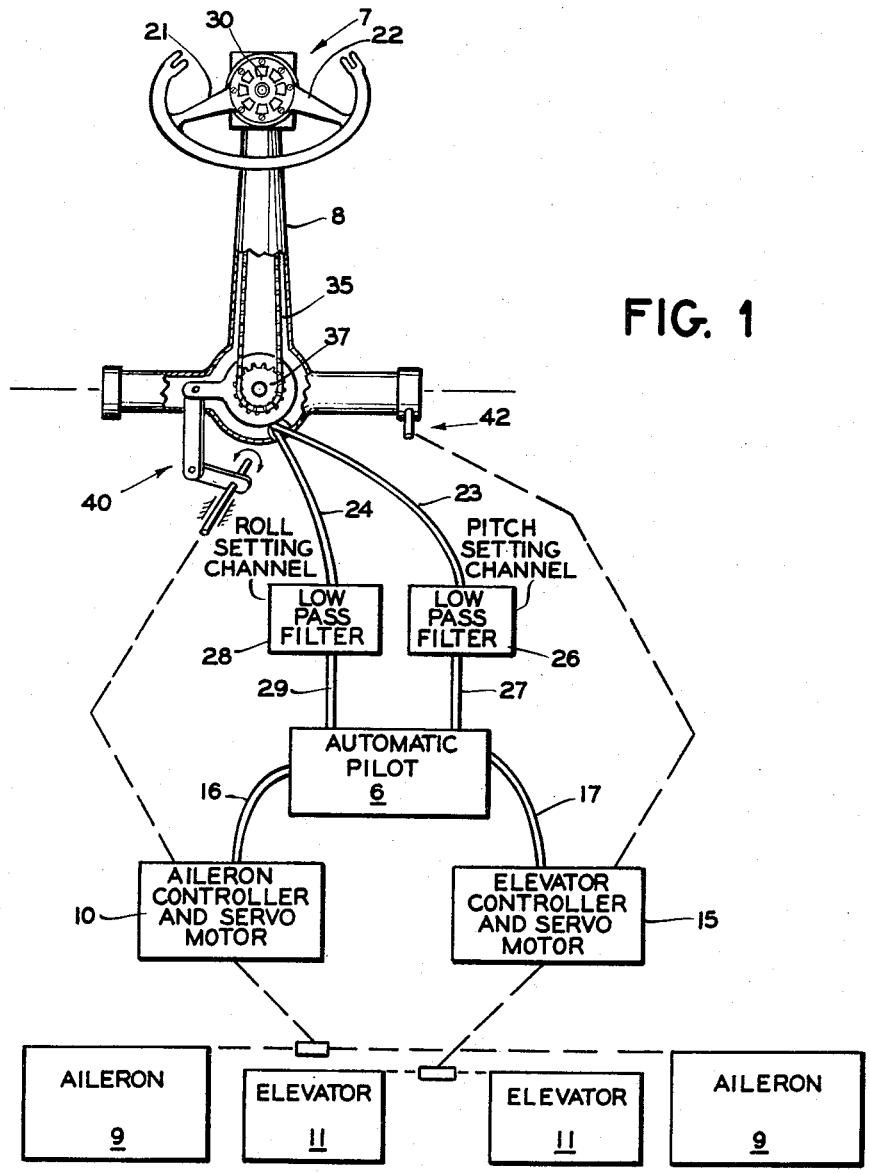
FIGURE 1 illustrates schematically a control wheel and column assembly embodying the present invention and shown in operative relation in a control system in which the invention is designed for use.

Referring to FIGURE 1 there is shown schematically a control system such as disclosed and claimed in the aforenoted U.S. Reissue Patent No. Re. 25,356, granted March 19, 1963, and in which system the improved control wheel of the present invention may be used. In the aforenoted system the control surfaces of an aircraft may be operated automatically by an automatic pilot system denoted generally at 6 or manually controlled by the improved control wheel 7 forming the subject matter of the invention and resiliently mounted in a control column 8. The manual control wheel 7 is mounted for angular movement relative to the control column 8 so that angular displacements thereof effectively control ailerons 9 through operation of a suitable controller and servo motor 10, as indicated diagrammatically in the drawing of FIGURE 1, while fore and aft displacements of the control column 8 in turn control elevators 11 through operation of a suitable controller and servo motor designated by the numeral 15.

Similarly as disclosed in the aforenoted U.S. Reissue Patent No. Re. 25,356, pitch and roll sensing devices operating in the automatic pilot 6 apply electrical signals through conduits 16 and 17 to motors 10 and 15 so as to effect operation of the elevators 11 and ailerons 9 to provide the desired controlling action.

Upon an application to the manual control wheel 7 of a force in excess of a predetermined value the deflective movement of the control wheel 7 is effective to cooperate with the steering shaft or control column, as explained hereinafter, to impart a force to override the operation of the controllers and servo motors 10 and 15 by the automatic pilot 6 and render the manual control wheel 7 effective to control the operation of the ailerons and elevators 9 and 11 through the controllers and servo motors 10 and 15 which may be of the type shown in FIGURE 4 of the aforenoted patent and explained therein.

*Improved Control Wheel and Column Assembly*

In accordance with the present invention, there are provided improved force translation means including electrical pick-up devices 18 and 19 mounted exteriorly of the control column 8 and adjacent a hub 20 of the control wheel 7 and within spokes 21 and 22 of the wheel 7. The electrical pickup devices 18 and 19 are of conventional type and are electrically included in the signal chain so that upon a force being applied to the manual control wheel 7 less than that required to overcome the operation of the elevator or aileron servo motors 10 and 15, there is developed a signal proportional to this force and in a sense or electrical phase depending upon the direction of the application of force. The developed signal is applied through a pitch setting channel conduit 23 or a roll setting channel conduit 24, as the case may be, and to either or both of the pair of low pass filters 26 and 28 and through conduits 27 and 29 leading from these filters to the automatic pilot control system 6 to vary the setting of the automatic pilot system, as described in the aforenoted patent. As explained therein, the low pass filters 26 and 28 are provided so that the inertia of the pilot's hand and the spring rate of the control wheel 7 will not form an oscillating system in varying the setting of the automatic pilot system 6.

The improved control wheel 7 forming the subject matter of the present invention is shown in detail in FIGURES 2, 3, 4 and 5 and includes an improved force sensing mechanism so that the human pilot of the aircraft may, by applying normal control forces to the wheel 7, maneuver the aircraft while it is on automatic control.

Figure 2:
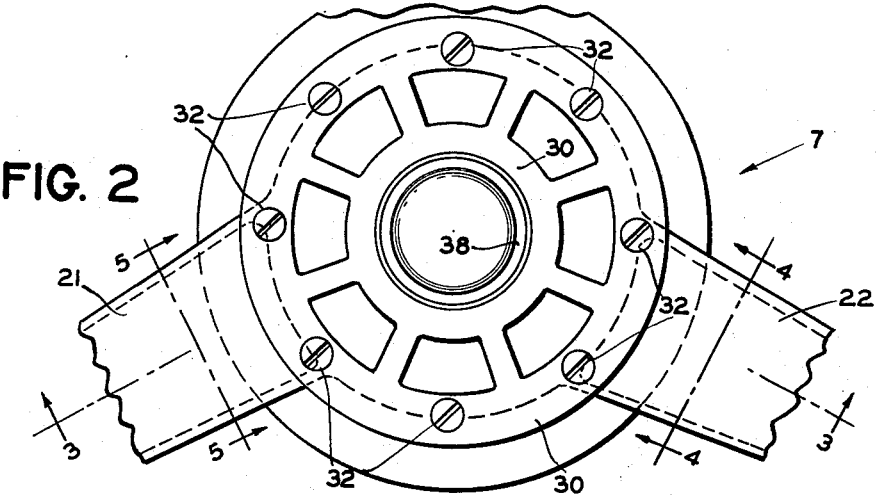
FIGURE 2 is an enlarged fragmentary top plan view of the hub and spokes of the improved control wheel.

In the aforenoted arrangement the control wheel 7 is yieldably coupled through a novel circular elastic spider or spoked diaphragm spring 30 to a steering shaft 31. The diaphragm spring 30 is fastened by screws 32 to an annular washer 33 and flange 36 about the outer edge of the hub 20 of the steering wheel 7 and further the diaphragm spring 30 is concentrically secured by a fastening nut 38 to the steering shaft 31, as shown in FIGURES 2 and 3.

The shaft 31 is rotatably mounted in the column 8 by roller bearings 39A and 39B. There is affixed to shaft 31 a sprocket 34 over which a sprocket chain 35 passes in operative relation. The chain 35 is in turn drivingly connected to a second sprocket 37 which in turn is operatively connected so as to actuate in a conventional manner a mechanical linkage 40, while the column 8 is pivotally mounted in a conventional manner so as to actuate a mechanical linkage 42, as shown schematically by FIGURE 1. Thus upon appropriate forces being exerted on the steering wheel 7 in an angular sense, the applied force may be transmitted through the steering shaft 31, sprocket 34, chain 35 and sprocket 37 to actuate the linkage 40 to effectively operate, as shown schematically in the drawing of FIGURE 1, the controller 10 for the ailerons 9, while upon appropriate forces being exerted on the steering wheel 7 in a fore or aft sense the applied force may be transmitted by pivotal movement of the column 8 to actuate the linkage 42 to effectively operate the controller 15 for the elevators 11.

Figure 3:
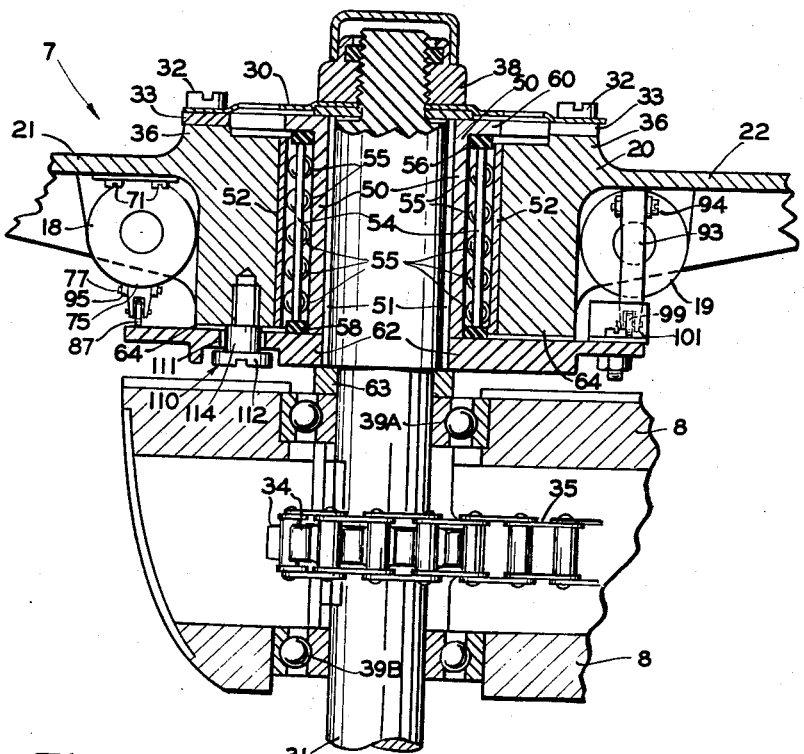
FIGURE 3 is a sectional view of the hub and spokes of the control wheel of FIGURE 2 taken along the lines 3—3 thereof and illustrating the operative arrangement of the electrical pickup means in relation to the spokes of the wheel and operating flange affixed to the steering shaft.

The arrangement is such that the control wheel 7 is yieldably coupled to the steering shaft 31 through the diaphragm spring 30 while within the hub 20 of the control wheel 7 there is provided a novel ball bearing mechanism, shown in FIGURE 3, and including an inner race 50 and an outer race 52 and a ball bearing cage or separator 54 carrying ball bearings 55 between the inner race 50 and outer race 52 and coacting with the spider or spoked diaphragm spring 30 in permitting limited axial and angular movements of the wheel 7 relative to the shaft 31.

The inner race 50 is fixed to the shaft 31 by suitable splines 51 formed therein and by the fastening nut 38, while the outer race 52 is press-fitted in the hub 20. There are further provided rubber bumpers 56 and 58 mounted at the opposite ends of the ball separator 54 to locate the ball separator 54 and to act as a dust seal. The annular rubber bumper 56 is positioned between one end of the ball separator 54 and an annular flange portion 60 of the inner race 50 while the other annular rubber bumper 58 is positioned between the opposite end of the ball separator 54 and a flange plate 62 fixed to the shaft 31 by the splines 51 and positioned between an inner end of the inner race 50 and one side of an annular bushing 63 bearing at the opposite side on the roller bearing 39A mounted in the column 8.

Figure 5:
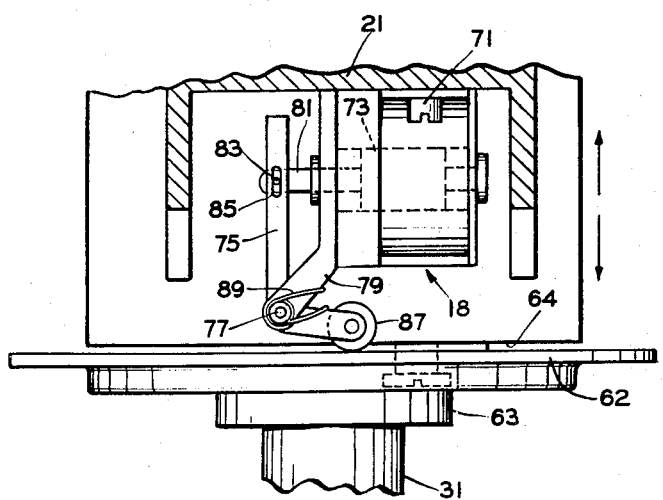
FIGURE 5 is an enlarged fragmentary view of the electrical pickup means for sensing fore and aft movement of the control wheel of FIGURE 1 and taken along the lines 5—5 of FIGURE 2.

The flange plate 62 is normally positioned in a spaced relation to an inner end 64 of the hub 20 of the wheel 7 and the arrangement is such that upon a fore or aft pressure being applied to the control wheel 7, the spider or spoked diaphragm spring 30 permits an axial displacement of the wheel 7 relative to the shaft 31 carried by the column 8 in the direction of the applied pressure which is in turn measured by the pitch sensor 18 fastened to the spoke 21 by bolts 71, as shown in FIGURES 3 and 5.

Operatively connected to a movable armature member 73 of the pitch sensor 18 is a control arm 75 pivotally mounted on a pin 77 carried by a bracket 79 projecting from the sensor 18. The arm 75 is operatively connected to the armature 73 through an actuating rod 81 and pin 83 projecting from the rod 81 and slidably mounted in a slot 85 provided in the arm 75. There is further provided at a free end of the arm 75 a roller 87 biased into contacting relation with a surface of the flange plate 62 by a spring 89 acting on the arm 75, as shown in FIGURE 5, to bias the arm 75 in a clockwise direction about the pin 77.

Thus upon a fore or aft pressure being applied to the control wheel 7 by the pilot the spoked or spider spring 30 permits a limited axial displacement of the hub 20 of the control wheel 7 relative to the shaft 31 carried by column 8. Such displacement in turn causes the control arm 75 to actuate the armature 73 so as to develop through the resulting operation of the pitch sensor or electrical pickup device 18 an electrical signal proportional to such applied force. This signal is in turn applied through the pitch setting channel conduit 23, as heretofore explained.

Figure 4:
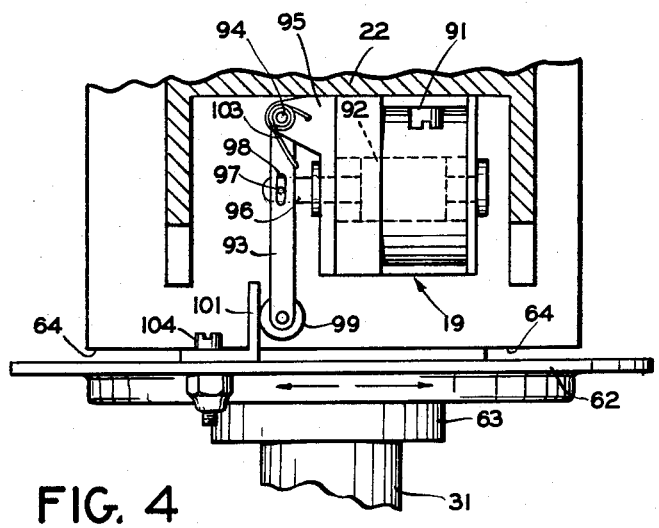
FIGURE 4 is an enlarged fragmentary view of the electrical pickup means for sensing angular movement of the control wheel of FIGURE 1 and taken along the lines 4—4 of FIGURE 2.

Further upon the operator of the control wheel 7 rotating the wheel or applying a pressure in an angular sense thereto, the spider or spoked spring 30 permits a limited displacement of the control wheel 7 relative to the shaft 31 in an angular sense, which relative angular displacement is in turn measured by the roll sensor 19 fastened to the spoke 22 by bolts 91, as shown in FIGURE 4.

Operatively connected to a movable armature member 92 of the roll sensor 19 is a control arm 93 pivotally mounted on a pin 94 carried by a bracket 95 projecting from the sensor 19. The arm 93 is operatively connected to the armature 92 through an actuating rod 96 and pin 97 projecting from the rod 96 and slidably mounted in a slot 98 provided in the arm 93. There is further provided at a free end of the arm 93 a roller 99 biased into contacting relation with a surface of an actuating member 101 by a spring 103 acting on the arm 93, as shown in FIGURE 4, to bias the arm 93 in a clockwise direction about the pin 94. The actuating member 101 is affixed to the flange plate 62 by a bolt 104.

Thus upon a pressure being applied to the control wheel 7 in an angular sense about the axis of the shaft 31, the spider or spoked spring 30 allows a limited displacement of the hub 20 of the wheel 7 relative to the flange plate 62 in a sense indicated by the arrows of FIGURE 4. Such displacement in turn causes the member 101 to actuate the arm 93 and thereby the armature 92 so as to develop through the resulting operation of the roll sensor or electrical pickup device 19 an electrical signal proportional to such applied force. This signal is in turn applied through the roll setting channel 24, as heretofore explained.

Further projecting from the hub 20 of the control wheel 7 is a stop bolt 110 extending through a slot 111 formed in the flange plate 62. The stop bolt 110 has a head portion 112 cooperating with flange plate 62 so as to limit axial displacement of the hub 20 relative to the shaft 31 in one sense while the flange plate 62 limits axial displacement of the hub 20 relative to the shaft 31 in an opposite pitch controlling sense by contacting the hub 20. Further the stop bolt has a stem portion 114 mounted loosely in the slot 111 provided in the flange plate 62 and cooperating therewith to limit the extent of the rotary or angular displacement of the hub 20 and thereby the control wheel 7 relative to the steering shaft 31 in a roll controlling sense.

The stop bolt 110 thereby provides a positive stop so arranged that in the event of failure of the spring 30 or other malfunction in the operation of the pitch or roll control sensors 18 and 19, the aircraft may be manually controlled through operation of the wheel 7 by the operative connection thereof to the steering shaft 31 and control column 8 through the stop bolt 110. The stop bolt 110 has sufficient clearance in its operative relation to the flange plate 62 as to permit the desired limited displacement of the pitch and roll sensors 18 and 19 and thereby the desired limited displacement of the control wheel 7 relative to the shaft 31 in the pitch and roll control senses.

The pitch control signal resulting from the aforenoted operation of the electrical pickup device 18 is carried by the conduit 23 leading to the low pass filter 26 and thereby to the automatic pilot 6, as shown in FIGURE 1, for varying the pitch setting thereof to effect operation of the elevator controller 15, as described in the aforenoted U.S. Reissue Patent No. Re. 25,356.

The roll control signal effected by the aforenoted operation of the electrical pickup device 19 is carried by the conduit 24 leading to the low pass filter 28 and thereby to the automatic pilot 6, as shown in FIGURE 1, for varying the roll setting thereof to effect operation of the aileron controller 10, as described in the aforenoted Feucht et al. U.S. Reissue Patent No. Re. 25,356.

Upon the hub 20 of the wheel 7 or the stop bolt 110 projecting therefrom and mounted in the slot 111 of the flange plate 62, contacting a portion of the flange plate 62 at the limit of permissible movement of the hub 20 relative to the flange plate 62 in an angular or fore or aft sense relative to the shaft 31, as the case may be, a further force applied to the control wheel 7 in the controlling sense will impart a direct movement to the control column 8 or steering shaft 31 so as to actuate the mechanical linkages 40 or 42 to effectively control manually the operation of the controllers 10 and 15 for the ailerons 9 and elevators 11.

Thus there is provided a novel, simplified and improved control wheel 7 and column 8 assembly whereby during the operation of the automatic pilot system 6, the human pilot can by exertion of a force exceeding a predetermined value set by the resilience of the single spider of circular spoked diaphragm spring 30 and operative arrangement of the simplified stop mechanism herein provided, overpower the automatic pilot system 6 and control the operation of the aileron and elevator surfaces 9 and 11 manually through the operation of the aileron and elevator controller mechanisms 10 and 15, described in the aforenoted Feucht et al. U.S. Reissue Patent No. Re. 25,356.

Further the resilient diaphragm spring 30 is suitably slotted in an arcuate plane so that a deflection of the control wheel 7 in an angular or roll sense relative to the steering shaft 31 requires a distinctly different force than the force required to effect a deflection of the control wheel 7 in a fore or aft or pitch sense relative to the steering shaft 31 and the arrangement of the resilient spider or spoked diaphragm spring 30 is such that control of the aircraft in a pitch sense by the fore and aft deflection of the control wheel 7 or in a roll sense by the angular deflection of the control wheel 7 is accompanied by a feel of the control wheel 7 which approximates that sensed by the pilot when flying under manual control. The operative assembly is such that a force applied through the control wheel 7 merely in a pitch sense will result only in a pitch signal being generated by the electrical pickup device 18 while a force applied through the control wheel 7 merely in a roll sense will result only in a roll signal being generated by the electrical pickup device 19. Upon forces being applied to the control wheel 7 commanding both pitch and roll, the pickup devices 18 and 19 will generate signals that are proportional to the respective forces without discernible cross coupling between the roll and pitch channels.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. A wheel force sensor comprising a wheel having a hub and at least two spokes projecting from said hub, a shaft, a ball bearing mechanism positioned between said shaft and hub, a spoked diaphragm spring attached between said hub and shaft to resiliently connect said hub to said shaft so as to permit both limited rotary and axial motions of said hub on said ball bearing mechanism with respect to the shaft, a flange plate affixed to said shaft, said hub being adjustably positioned relative to said flange plate upon rotary and axial motion of said hub with respect to said shaft, a first signal generating device carried by one of the spokes of said wheel, a second signal generating device carried by another of the spokes of said wheel, means operative by said flange plate for causing said first signal generating device to generate an electrical signal in response to the adjusted rotary position of the hub relative to the flange plate, and other means operative by said flange plate for causing said second signal generating device to generate a separate electrical signal in response to the adjusted axial position of the hub relative to the flange plate.

2. A wheel force sensor comprising a wheel having a hub and at least two spokes projecting from said hub, a shaft, a ball bearing mechanism positioned between said shaft and hub, a spoked diaphragm spring attached between said hub and shaft to resiliently connect said hub to said shaft so as to permit both limited rotary and axial motions of said hub on said ball bearing mechanism with respect to the shaft, a flange plate affixed to said shaft, said hub being adjustably positioned relative to said flange plate upon rotary and axial motion of said hub with respect to said shaft, a first signal generating device carried by one of the spokes of said wheel, a second signal generating device carried by another of the spokes of said wheel, means operative by said flange plate for causing said first signal generating device to generate an electrical signal in response to the adjusted rotary position of the hub relative to the flange plate, other means operative by said flange plate for causing said second signal generating device to generate a separate electrical signal in response to the adjusted axial position of the hub relative to the flange plate, and a stop member projecting from the hub into cooperative relation with the flange plate to limit both the adjusted rotary and axial positioning of said hub relative to said flange plate to within predetermined operating ranges and to effect an operative mechanical connection between said wheel and shaft upon a motion of said hub with respect to the flange plate in excess of one of said operating ranges.

3. In a steering system of a type including a control column mounted to move about a first axis, a steering shaft rotatably mounted in said column and movable about a second axis, and an operator-operative control wheel having a hub member coaxially arranged with respect to said steering shaft; the improvement comprising an elastic spider connecting said steering shaft and hub member, said steering shaft having a flange member thereon, said elastic spider biasing said hub member to a predetermined normal axial position in spaced relation to said flange member and to a predetermined normal angular position in relation to said flange member, a first electrical pickup device operatively connected between said hub and flange members in such a manner as to provide an electrical signal proportional to a variance in the position of said hub member from said normal axial position, a second electrical pickup device operatively connected between said hub and flange members in such a manner as to provide an electrical signal proportional to a variance in the position of said hub member from said normal angular position, coupling means operatively connecting said hub and flange members and thereby said control wheel and column upon axial adjustment of said control wheel relative to said steering shaft in excess of a predetermined resilient operating range of the elastic spider in said axial sense, and said coupling means including other means operatively connecting said hub and flange members and thereby said control wheel and steering shaft upon angular adjustment of said control wheel relative to said steering shaft in excess of a predetermined resilient operating range of the elastic spider in said angular sense.

References Cited in the file of this patent

UNITED STATES PATENTS

| | | |
|---|---|---|
| 1,204,925 | Aldrich | Nov. 14, 1916 |
| 2,408,770 | Frische et al. | Oct. 8, 1946 |
| 2,855,767 | Ahlen | Oct. 14, 1958 |
| 2,895,086 | Pettit | July 14, 1959 |